United States Patent
Gurau

(10) Patent No.: US 9,314,931 B2
(45) Date of Patent: Apr. 19, 2016

(54) ROBOTIC FUEL CELL ASSEMBLY SYSTEM
(71) Applicant: Vladimir Gurau, North Royalton, OH (US)
(72) Inventor: Vladimir Gurau, North Royalton, OH (US)
(73) Assignee: Kent State University, Kent, OH (US)
( * ) Notice: Subject to any disclaimer, the term of this patent is extended or adjusted under 35 U.S.C. 154(b) by 0 days.
(21) Appl. No.: 14/567,860
(22) Filed: Dec. 11, 2014
(65) Prior Publication Data
US 2015/0158179 A1 Jun. 11, 2015

Related U.S. Application Data
(60) Provisional application No. 61/914,558, filed on Dec. 11, 2013.
(51) Int. Cl.
*B25J 15/00* (2006.01)
*B25J 15/06* (2006.01)
(52) U.S. Cl.
CPC ............ *B25J 15/009* (2013.01); *B25J 15/0616* (2013.01)
(58) Field of Classification Search
CPC combination set(s) only.
See application file for complete search history.

(56) References Cited

U.S. PATENT DOCUMENTS

| | | | | | |
|---|---|---|---|---|---|
| 5,515,599 | A * | 5/1996 | Best | ............ | B23Q 1/5481 29/38 C |
| 5,848,859 | A * | 12/1998 | Clark | ............ | B23B 39/14 408/1 R |
| 6,786,896 | B1 * | 9/2004 | Madhani | ............ | A61B 19/22 128/898 |
| 7,361,065 | B1 * | 4/2008 | Hardy | ............ | H01M 8/0247 439/329 |
| 8,722,274 | B2 * | 5/2014 | Miller | ............ | B23K 31/02 429/467 |
| 2003/0127806 | A1 * | 7/2003 | Belchuk | ............ | H01M 8/0273 277/609 |
| 2005/0166413 | A1 * | 8/2005 | Crampton | ............ | B25J 13/088 33/503 |
| 2005/0240290 | A1 * | 10/2005 | Stone | ............ | B25J 9/1692 700/57 |
| 2007/0108068 | A1 * | 5/2007 | Suh | ............ | B82Y 30/00 205/766 |
| 2008/0048306 | A1 * | 2/2008 | Stewart | ............ | H01L 21/67115 257/684 |
| 2008/0075842 | A1 * | 3/2008 | Brewster | ............ | H01M 4/8615 427/115 |
| 2009/0271023 | A1 * | 10/2009 | Lee | ............ | H01M 8/023 700/159 |
| 2010/0078334 | A1 * | 4/2010 | Woodruff | ............ | C25F 7/00 205/671 |
| 2010/0128389 | A1 * | 5/2010 | Chandrasekaran | .. | G11B 25/043 360/98.08 |
| 2010/0196249 | A1 * | 8/2010 | Hata | ............ | B82Y 30/00 423/447.2 |
| 2011/0020096 | A1 * | 1/2011 | Mink | ............ | H01L 21/67721 414/222.01 |
| 2012/0207538 | A1 * | 8/2012 | Rizk | ............ | B25J 15/04 403/315 |
| 2013/0212883 | A1 * | 8/2013 | Soto Martinez | ...... | B23P 19/005 29/897.2 |
| 2013/0334928 | A1 * | 12/2013 | Clark | ............ | H01L 41/0973 310/317 |
| 2014/0170735 | A1 * | 6/2014 | Holmes | ............ | G01N 21/07 435/287.1 |

* cited by examiner

*Primary Examiner* — Jonathan L Sample
(74) *Attorney, Agent, or Firm* — Renner, Kenner, Greive, Bobak, Taylor & Weber

(57) ABSTRACT

A robotic fuel cell assembly system includes an end-effector, robotic workcell, and fuel cell components that have integrated design features that allow accurate component alignment during the assembly process of a fuel cell stack within a desired tolerance, while avoiding component overlap, which is a major cause of overboard gas leaks during the fuel cell operation. Accurate component alignment is achieved by electrically non-conductive alignment pins that are mounted on a fuel cell base plate, which are configured to be received by guide holes formed on the fuel cell components, and alignment holes provided by an alignment arm attached to the end-effector. The end-effector also includes a passive compliance system that includes two perpendicularly mounted miniature linear blocks and rails, which serve to compensate for the limitations in the ability of the robotic arm to move the end-effector accurately in a repeated manner.

23 Claims, 8 Drawing Sheets

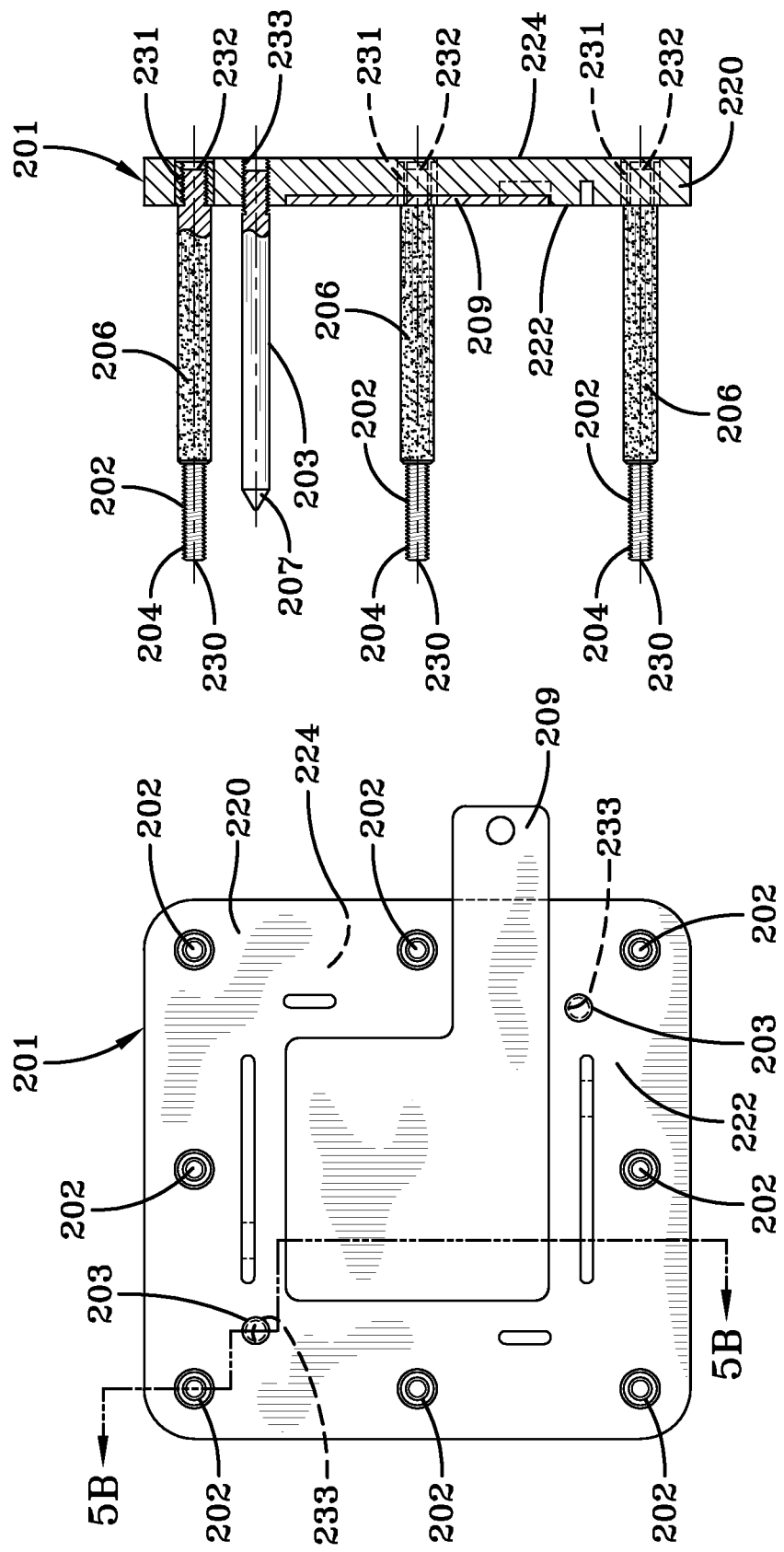

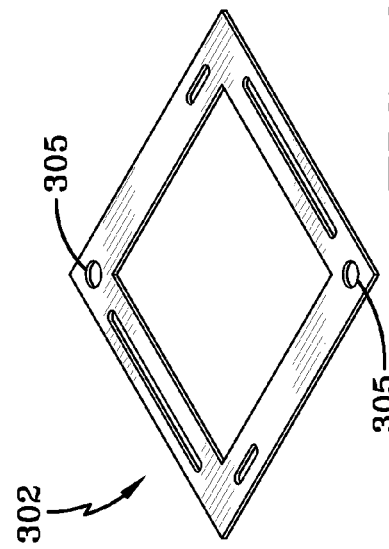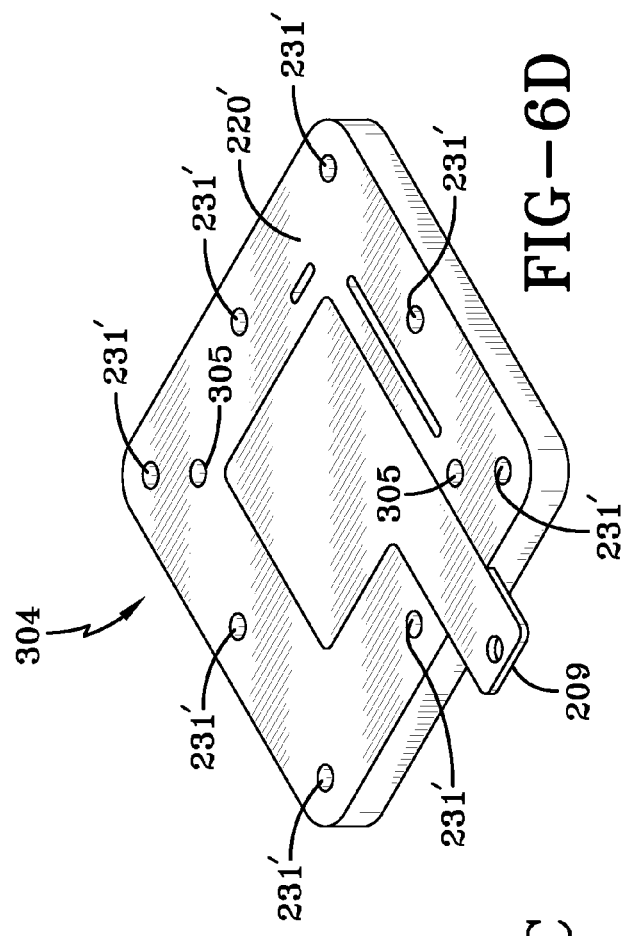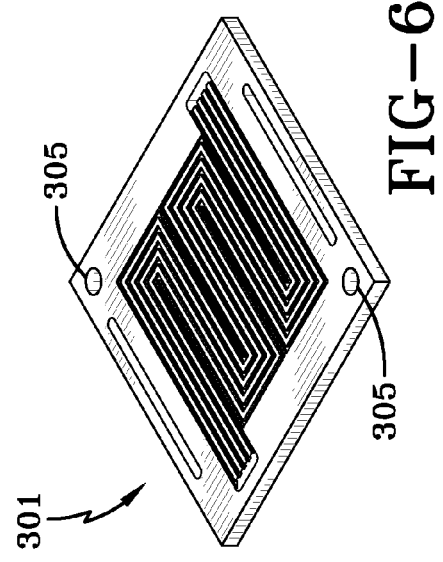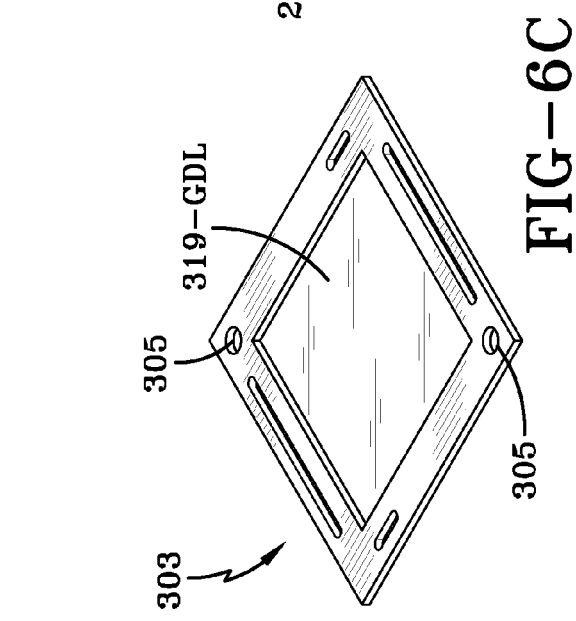

ROBOTIC FUEL CELL ASSEMBLY SYSTEM

CROSS-REFERENCE TO RELATED APPLICATION

This application claims the benefit of U.S. Provisional Application No. 61/914,558 filed on Dec. 11, 2013, the contents of which are incorporated herein by reference.

TECHNICAL FIELD

The present invention generally relates to robotic systems. In particular, the present invention relates to robotic systems used to manufacture fuel cells, such as proton exchange membrane fuel cells (PEMFCs). More particularly, the present invention is directed to an end-effector for a robotic arm, and associated fuel cell components that have integrated design features that facilitate the automated assembly of PEMFC fuel cells.

BACKGROUND OF THE INVENTION

Proton exchange membrane fuel cells (PEMFCs) generate electricity from an electrochemical reaction between hydrogen and oxygen. Such PEMFCs provide high power density, reduced weight and volume, and rapid start-up, while having enhanced durability, as compared with other types of fuel cells. Thus, PEMFCs are promising sources of electrical energy for a variety of applications, such as automotive applications, stationary power source applications, such as back-up power source applications, and portable power source applications. As a result, such fuel cells have the ability to reduce the dependence on other energy sources, including the dependence on oil and other fossil fuels.

One key obstacle in the adoption of PEMFCs, and the use of hydrogen as a fuel source, is the cost of manufacturing the PEMFCs themselves. Current-generation PEMFC fuel cells are formed as a stack of a plurality of layered components, which are assembled manually, through a time-consuming, complex and repetitive manufacturing process. As a result of the tedious manual manufacturing process, the occurrence of defects in the completed fuel cells due to human errors is common. In addition, due to the time-consuming nature of the manufacturing process, it is common to take as long as a full day to assemble and leak-test a single PEMFC hydrogen fuel cell stack. However, in order to be commercially viable, fuel cell stacks must be assembled with minimal defects in a time efficient manner.

To overcome the drawbacks associated with the manual assembly of PEMFC fuel cells, automated assembly techniques utilizing robotic systems have been developed. Unfortunately, current automated manufacturing systems have had limited success, due to the difficulty in accurately and precisely aligning each adjacent component layer in the fuel cell stack. For example, such components forming a layer in the fuel cell stack includes thin, flexible membrane electrode assemblies (MEAs), rubber gaskets, graphite paper, graphite bipolar plates, copper current collector plates and top/bottom end-plates. Thus, because these components must be precisely aligned during manufacturing to produce a functional fuel cell and to eliminate overbroad reactant leaks, an automated system for carrying out the manufacture of the PEMFC fuel cell is desirable.

Additional obstacles in achieving precision automated assembly of PEMFC fuel cell stacks relate to the robotic assembly systems themselves. That is, current robotic assembly systems are limited due to their lack of compliance; their lack of flexibility of the joints of the robotic arm; and the inability of the robotic arm to accurately repeat movements, which reduces the ability of the robotic arm to tolerate and compensate for misaligned fuel cell components during the assembly of a completed fuel cell.

Another barrier to the successful operation of automated manufacturing lines of fuel cells is the insufficient integration of the design of the fuel cell components with the design of the automated assembly line, including the end-effector used by the robotic arm, which also contributes to the lack of accuracy and precision during the alignment of the fuel cell components.

Therefore, there is a need for a robotic fuel cell assembly system that includes an end-effector for a robotic arm and fuel cell components that include integrated design features that allow for accurate and precise alignment between adjacent components in a fuel cell stack during automated pick-up and release operations. In addition, there is a need for a robotic fuel cell assembly system that includes an end-effector for a robotic arm that is configured to compensate for the limited accuracy, repeatability and lack of compliance of the robotic arm used to move and the end-effector during the manufacture of a fuel cell.

SUMMARY OF THE INVENTION

In light of the foregoing, it is a first aspect of the present invention to provide an end-effector for attachment to a moveable wrist assembly of a robotic arm for assembly of a fuel cell stack comprising a connection assembly adapted to be attached to the wrist assembly of the robotic arm; a movement assembly attached to the connection assembly; and an operation assembly attached to the moving assembly, wherein the moving assembly is configured to enable the operation assembly to move relative to the connection assembly, the operation assembly including an alignment arm having at least two alignment apertures disposed therethrough and at least one vacuum cup; wherein the alignment arm has at least two alignment apertures that are configured to receive alignment pins provided by a plurality of component bases each carrying one or more fuel cell components aligned by the alignment pins, so as to position the one or more vacuum cups with the fuel cell component being grasped, and the at least two alignment apertures of the alignment arm configured to receive alignment pins provided by a fuel cell base plate of the fuel cell stack, so as to align the grasped fuel cell component with the alignment pins of the fuel cell base plate when the grasped fuel cell component is placed thereon.

It is another aspect of the present invention to provide a method for assembling a fuel cell stack using a robotic arm comprising providing a plurality of component bases having at least two alignment pins extending therefrom, each the component base carrying one or more fuel cell components, such that each fuel cell component is aligned by the at least two alignment pins; providing a fuel cell base plate having at least two alignment pins extending therefrom; providing an end-effector having a connection assembly attached to the robotic arm, the end-effector including an alignment arm having at least two alignment apertures disposed therethrough, and at least one vacuum cup to grasp and release the one or more fuel cell components, wherein the alignment arm and the at least one vacuum cup are moveably attached to the connection assembly; moving the end-effector, such that the alignment apertures of the alignment arm receive the alignment pins of one of the plurality of component bases; controlling the end-effector to grasp the fuel cell component from the component base; moving the end-effector with the grasped fuel cell component, such that the alignment apertures of the alignment arm receive the alignment pins of the fuel cell base plate; and controlling the end-effector to release the component onto the full cell base plate so that the fuel cell component is in alignment with the alignment pins of the fuel cell base plate.

Yet another aspect of the present invention is to provide a robotic workcell for assembling a fuel cell comprising an end-effector comprising an assembly adapted to be attached to a moveable wrist assembly of a robotic arm of the workcell; a movement assembly attached to the connection assembly; and an operation assembly attached to the moving assembly, wherein the movement assembly is configured to enable the operation assembly to move relative to the connection assembly, the operation assembly including an alignment arm having at least two alignment apertures disposed therethrough and at least one vacuum cup; a plurality of component bases having at least two alignment pins extending therefrom, each the component base carrying at least one fuel cell component in alignment with the at least two alignment pins; and a fuel cell base plate having at least two alignment pins extending therefrom; wherein during a first step operation, the alignment apertures of the alignment arm are received by the at least two alignment pins of one of the plurality of component bases, whereupon the vacuum cups grasp the fuel cell component, and during a second step, the alignment apertures of the alignment arm are received by the at least two alignment pins of the fuel cell base plate, whereupon the vacuum cups release the fuel cell component onto the fuel cell end plate in alignment with the alignment pins of the fuel cell end plate.

It is a further aspect of the present invention to provide an innovative, inexpensive end-effector for a robotic arm that provides passive compliance and that is capable of handling a variety of fuel cell components, such as a membrane electrode assemblies (MEA), bipolar plates, and gaskets, so that the components are precisely aligned during manufacture of the fuel cell stack, so as to avoid overboard reactant gas leaks.

Yet another aspect of the present invention to provide a method for aligning fuel cell components in the stack during an automated assembly process by using electrically nonconductive alignment pins that are permanently mounted on one endplate and by using positioning holes that are formed on the fuel cell components.

Still another aspect of the present invention to provide an end-effector that achieves passive compliance by using two mutually perpendicular miniature linear blocks with rails mounted on the end-effector.

It is yet another aspect of the present invention to provide a method for the end-effector to pick up and release the fuel cell components by using winglets with positioning holes mounted on the end-effector.

It is a further aspect of the present invention to provide a robotic workcell for automated fuel cell assembly.

BRIEF DESCRIPTION OF THE DRAWINGS

These and other features and advantages of the present invention will become better understood with regard to the following description, appended claims, and accompanying drawings wherein:

FIG. 5A is a top plan view of the fuel cell endplate assembly in accordance with the concepts of the present invention;

FIG. 5B a cross-sectional view of the fuel cell endplate assembly shown in FIG. 5A in accordance with the concepts of the present invention;

FIG. 6A is a perspective view of a fuel cell bipolar plate providing guide holes in a peripheral area thereof in accordance with the concepts of the present invention;

FIG. 6B is a perspective view of a gasket providing guide holes in a peripheral area thereof in accordance with the concepts of the present invention;

FIG. 6C is a perspective view of a membrane electrode assembly providing guide holes in a peripheral area thereof in accordance with the concepts of the present invention;

FIG. 6D is a perspective view of a cap plate providing guide holes in a peripheral area thereof in accordance with the concepts of the present invention;

DETAILED DESCRIPTION OF THE INVENTION

Figure 1:
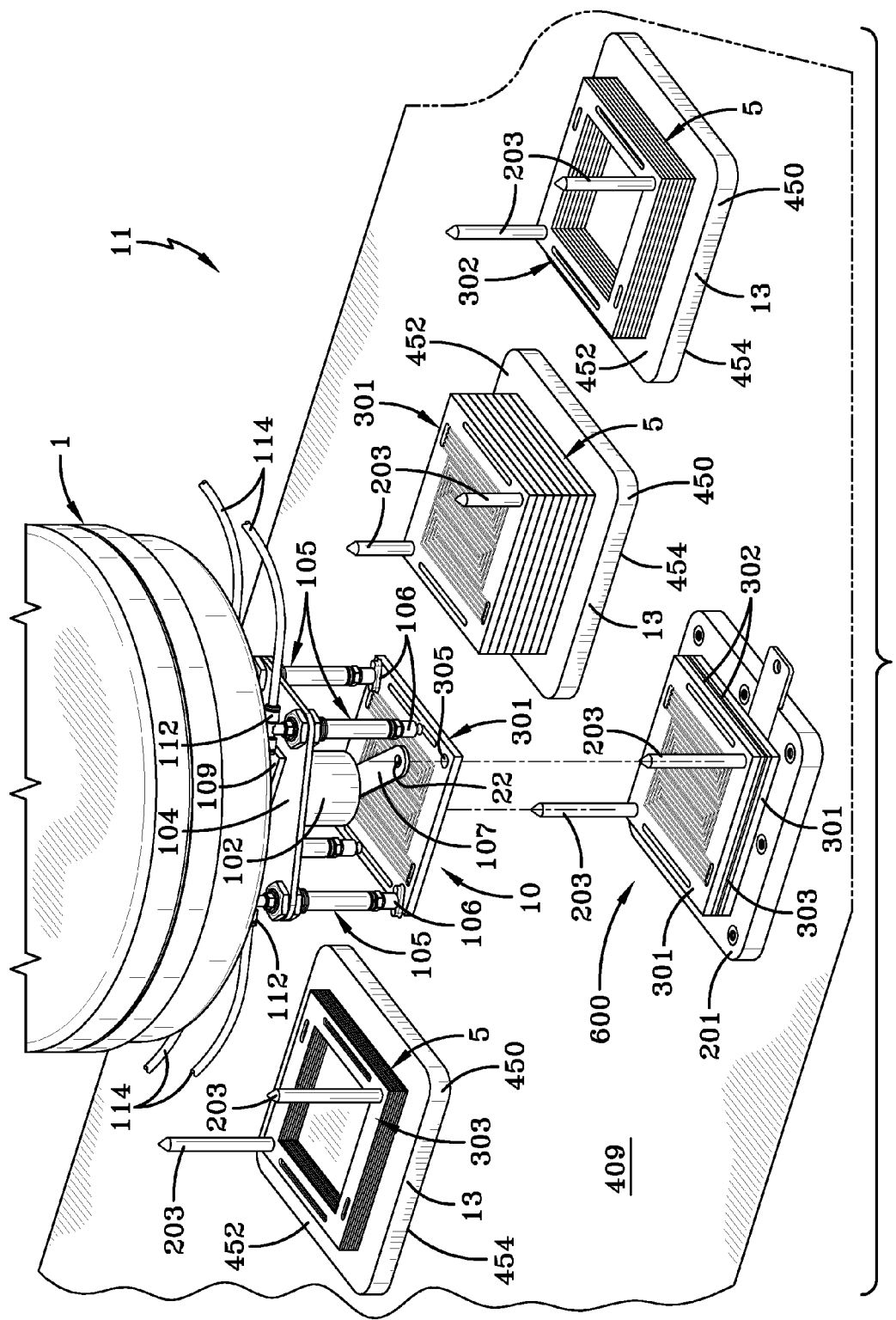
FIG. 1 is a perspective view of a robotic workcell utilizing an end-effector for the automated assembly of fuel cells in accordance with the concepts of the present invention.

A robotic fuel cell assembly system includes a robotic arm 1 to which an end-effector 10 is attached, as shown in FIG. 1 of the drawings. The robotic arm 1 and the end-effector 10 are provided as part of a robotic workcell 11 that includes vertically arranged stacks of a plurality of fuel cell components 5. Each stack of fuel cell components 5 is carried on a component base 13, which includes alignment pins 203 that serve to precisely align the stacked fuel cell components 5 thereon via guide holes 305 disposed through the fuel cell components. The end-effector 10 includes an alignment arm 107 that is configured to receive the alignment pins 203 of the component bases 13 therethrough. As a result, the end-effector 10 is able to be precisely and accurately aligned with the component base 13 during a pick-up operation as individual fuel cell components are grasped or picked from each of the component bases 13. Once the individual fuel cell component has been picked or grasped, the end effector 10 is moved to place the particular fuel cell component onto a fuel cell base or end plate 201, which forms a portion of the completed fuel cell 600. The end plate 201 also includes alignment pins 203 that extend therefrom. As such, the alignment arm 107 of the end-effector 10 receives the alignment pins 203 of the end plate 201, so as to be precisely and accurately aligned with the endplate 201 during a placing operation in which individual fuel cell components are disposed on the base plate 201 to form the completed fuel cell 600, shown in FIGS. 7A-B. That is, once the end-effector 10 and the base plate 201 are aligned, the end-effector 10 places or "stacks" the fuel cell component on the fuel cell base plate 201 or upon a previously stacked component already carried upon the fuel cell base plate 201. Such picking and placing process is repeated by the end-effector 10 for each of the fuel cell components used to form the completed fuel cell 600. Due to the physical interaction between the end-effector 10 and the alignment pins 203 of the component bases 13 and the base plate 201, precise alignment between each of the fuel cell components is maintained throughout the assembly of the completed fuel cell stack 600. Thus, the integrated design features of the end effector 10, the individual fuel cell components, the component bases 13 and the fuel cell base plate 201 allow the automated assembly of the fuel cell 600 to be completed in a precise and efficient manner with reduced defects.

Figure 2:
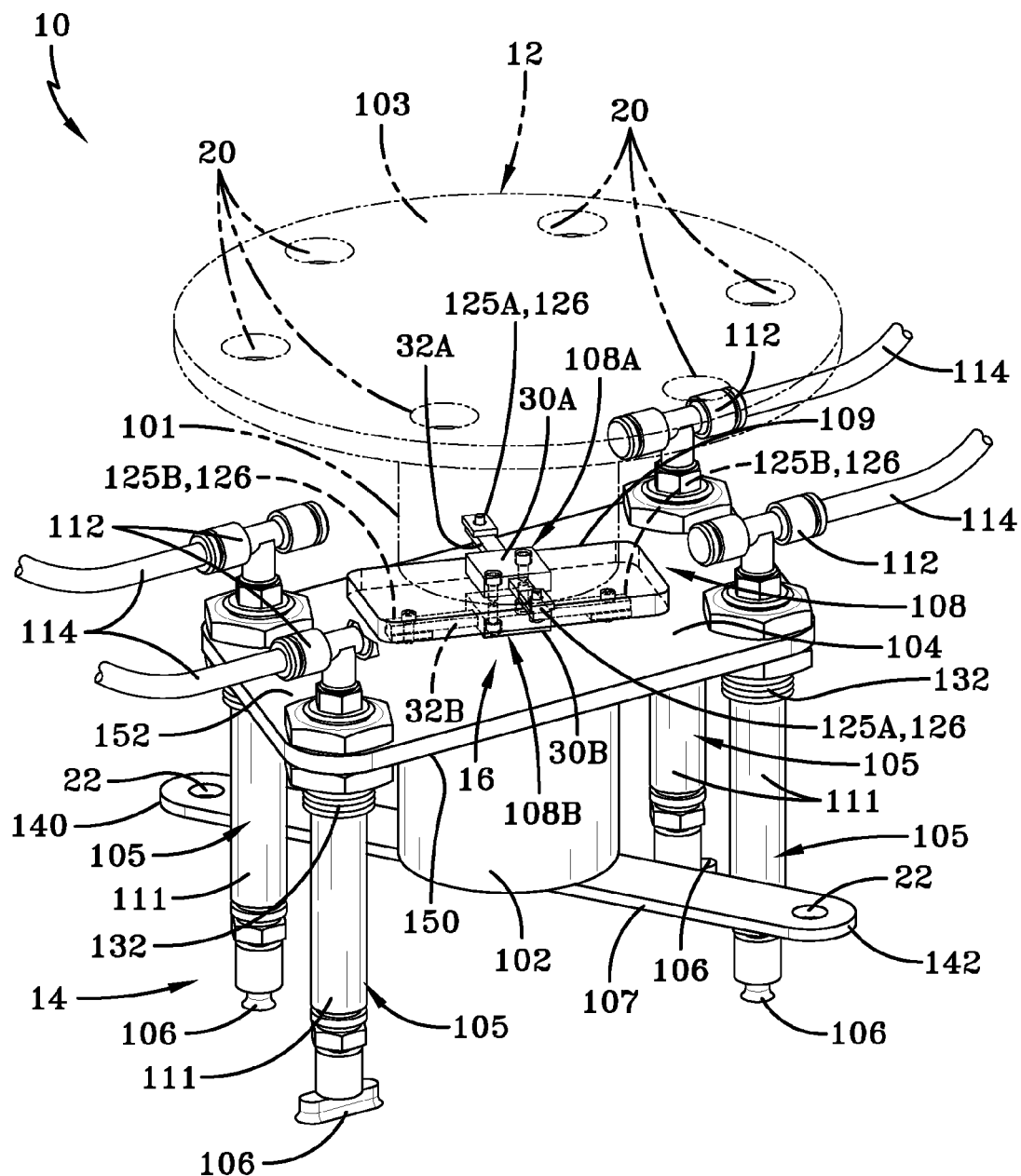
FIG. 2 is a perspective view of the end-effector in accordance with the concepts of the present invention.
Figure 3A:
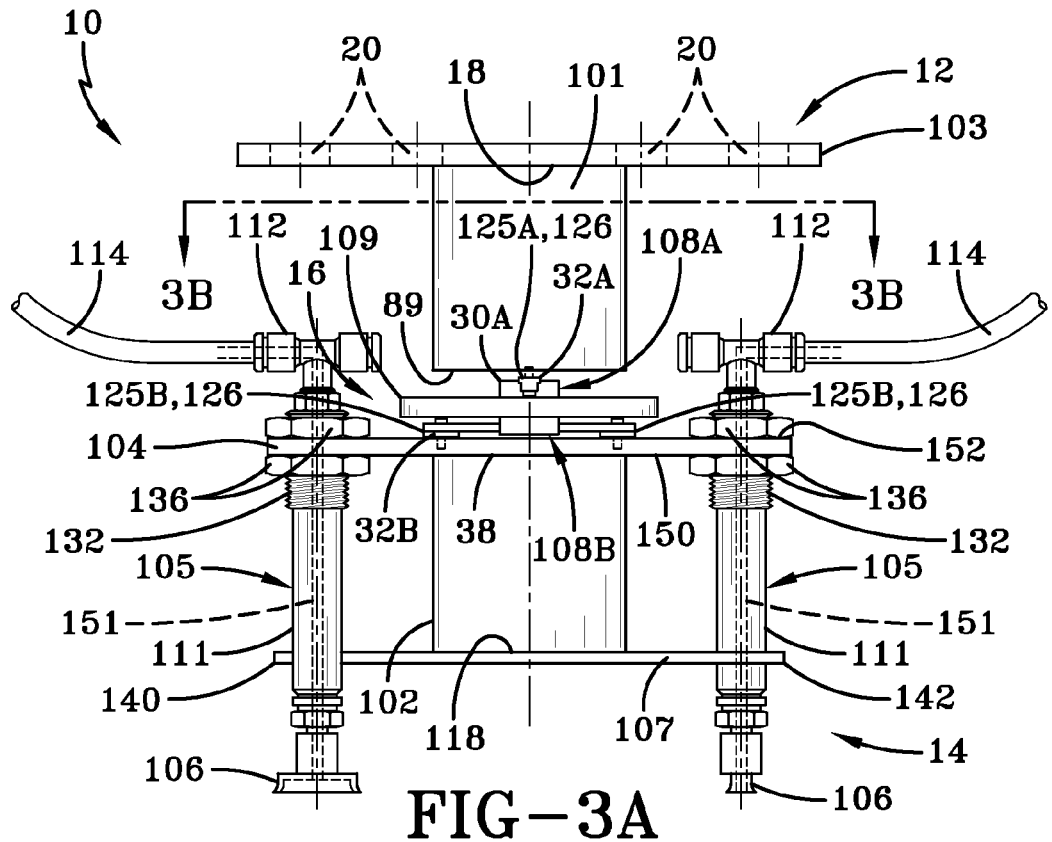
FIG. 3A is an elevational view of the robotic end-effector in accordance with the concepts of the present invention.
Figure 3B:
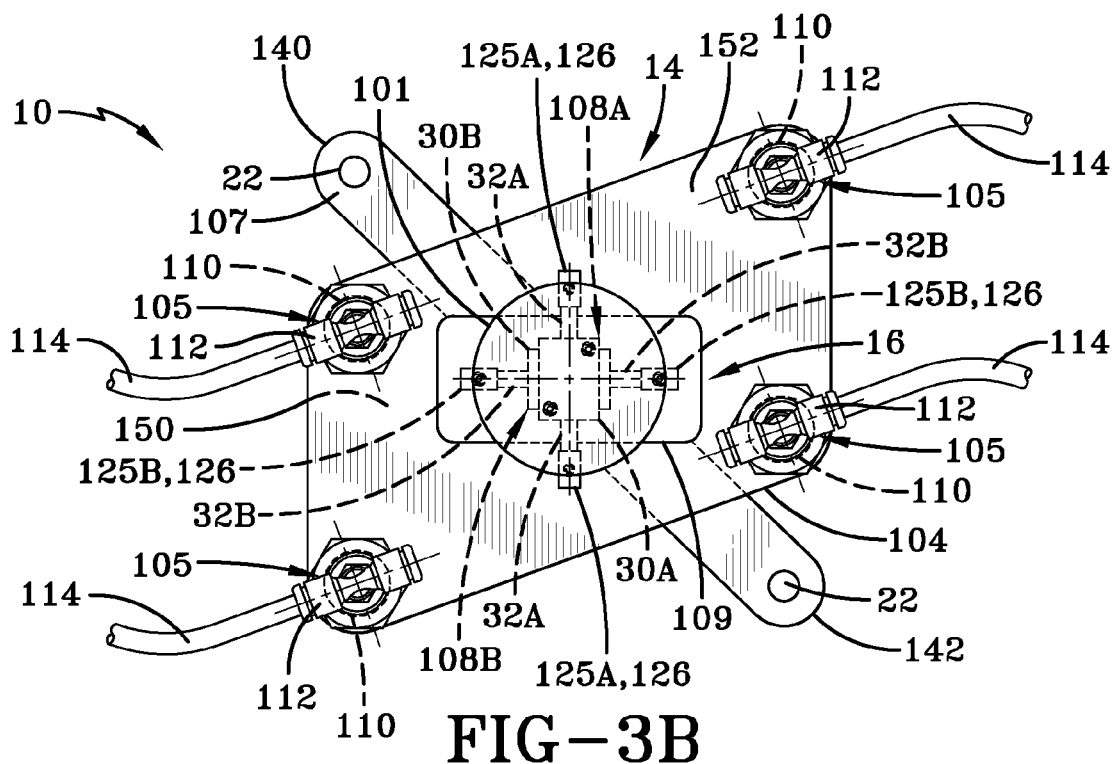
FIG. 3B is a top plan view of the end-effector shown in FIG. 3A in accordance with the concepts of the present invention.

Specifically, the end-effector 10, as shown in FIGS. 2 and 3A-B, comprises a connection assembly 12 and an operation assembly 14 that are moveably joined together by a movement assembly 16. The connection assembly 12 of the end-effector 10 includes an upper support 101, such that a connection plate 103 is rigidly attached to an upper face 18 of the upper support 101. As such, the upper support 101 extends from the connection plate 103 at a substantially right angle. The connection plate 103 is substantially planar or flat in shape, and includes a plurality of attachment holes 20 disposed therethrough for attachment to a movable wrist assembly (not shown) provided by the robotic arm 1 using any suitable fastening means, such as a nut and bolt for example. However, the connection plate 103 may comprise any suitable shape, such as a curved shape. The upper support 101 comprises an elongated section that extends along the longitudinal axis of the end-effector 10, and may have any suitable cross-sectional shape, such as a cylindrical shape. It should be appreciated that the connection assembly 12 may comprise any suitable mounting or attachment assembly, such as a mounting bracket, configured for attaching the end-effector 10 to the wrist assembly of the robotic arm 1. It should be appreciated that the wrist assembly is configured to move under the control of the robotic arm 1 in any desired position to carry out the assembly of the fuel cell 600, shown in FIGS. 7A-B.

The operation assembly 14 includes a support plate 104 that has opposed inner and outer surfaces 150,152 and is substantially planar or flat in shape, and includes a plurality of carrier holes 110 therethrough. An upper face 38 of a lower support 102 is attached to the inner surface 150 of the support plate 104, such that the lower support 102 extends from the support plate 104 at a substantially right angle. The lower support 102 comprises an elongated section that extends along the longitudinal axis of the end-effector 10, and may have any suitable cross-sectional shape, such as a cylindrical shape. It should also be appreciated that the support plate 104 may comprise any suitable shape, such as a flat or curved shape. For example, four carrier holes 110 may be provided such that they are arranged so that the centers of the carrier holes 110, when connected, form the corners of a parallelogram. However, it should be appreciated that the carrier holes 110 may be arranged in any suitable configuration, and may comprise any desired number. It should also be appreciated that the shape of the support plate 104 may be configured to substantially conform to the parallelogram or other shape defined by the arrangement of the position of the carrier holes 110.

The support plate 104 carries a plurality of level compensators 105 that each include an elongated shaft 111 having vacuum cups 106 mounted at one end distal to the connection assembly 12 and a pneumatic fitting 112 mounted at another end proximate to the connection assembly 12. As such, the level compensators 105 extend from the inner surface 150 of the support plate 104 at a substantially right angle. One level compensator 105 is mounted in each of the carrier holes 110 provided by the support plate 104. In one aspect, the level compensators 105 may be mounted to the holes 110 via an adjustable suspension mechanism 130. For example, the adjustable suspension mechanism 130 may comprise threads 132 that are disposed on the shaft 109, thereby allowing the level compensator 105 to be rotated upward or downward, whereupon the vertical position of level compensator 105 may be locked to the support plate 104 by one or more retaining nuts 136 carried by the threads 132. As such, the suspension mechanism 130 allows the position of the vacuum cups 106 to be adjusted relative to the support plate 104. However, in other embodiments, the level compensators 105 may be rigidly attached to the support plate 104 without any adjustment function.

The vacuum cups 106 mounted on one end of the shaft 111 of each level compensator 105, are in operative communication with the pneumatic fitting or coupler 112 that is attached to the opposite end of the level compensator 105 using any suitable technique. For example, the shafts 111 of the level compensators 105 may include a port or cavity 151 disposed therein that fluidly couples the vacuum cups 106 to the pneumatic fitting 112. The vacuum cups 106 are connected to a vacuum pump (not shown) through flexible tubes 114 that are coupled to each of the fittings 112 mounted on each of the level compensators 105. Thus, the vacuum cups 106 operate pneumatically to pick up and release the various fuel cell components that are used to manufacture the fuel cell stack 600 in a manner to be discussed. As such, the vacuum cups 106 together with the level compensators 105 are used to provide a soft touch and to reduce indexing of the robotic arm 1 when picking up and releasing components of the fuel cell stacks.

An alignment plate or arm (winglet) 107 is rigidly attached to a lower face 118 of the lower support 102, whereby the lower face 118 of the lower support 102 is opposite to the upper face 38 of the lower support 102. The alignment arm 107 includes a plurality of spaced positioning holes or apertures 22 disposed therethrough. Specifically, the alignment arm 107 comprises a substantially planar or flat section having opposed ends 140,142. However, it should be appreciated that the alignment arm 107 may comprise any suitable shape, such as a curved shape for example. The alignment arm 107 is elongated and radially extends at a substantially right angle from the lower support 102 and the longitudinal axis of the end-effector 10. In one aspect, the alignment arm 107 may be configured such that one positioning hole 22 is located proximate to each end 140,142. In one aspect, the alignment arm 107 may have a length such that the centers of the positioning holes 22 define a circle around the periphery of the support plate 104 when connected. In other words, the alignment holes 22 are positioned so that they extend beyond the periphery or edge 150 of the support plate 104. It should be appreciated that the alignment arm 107 may have a lengthwise dimension that is larger than its widthwise dimension. It should be appreciated that the alignment holes 22 are dimensioned to receive the alignment pins 203, which will be discussed in detail below. Further, it should be appreciated that the alignment holes 22 and the alignment pins 203 may take on any shapes that are compatible with each other, such as an oval or triangular shape for example. It should also be appreciated that the alignment arm 107 may be positioned at any desired angle relative to the X-Y paths defined by the block and rail assemblies 108A-B, to be discussed, such as a 45° angle or an oblique angle.

The connection assembly 12 and the operation assembly 14 are axially aligned along the longitudinal axis of the end-effector 10 and are moveably connected to each other via the movement assembly 16. However, it should be appreciated that in other embodiments of the end-effector 10, the connection assembly 12 and the operation assembly 14 are not axially aligned along the longitudinal axis of the end-effector 10. As such, the connection plate 103, the support plate 104, and the alignment arm 107 are each disposed in substantially parallel planes with respect to each other. As such, the alignment arm 107 is capable of moving independently, relative to the connection assembly 12 and the robotic arm 1, to which the end-effector 10 is attached.

The movement assembly 16 comprises two perpendicularly mounted miniature linear block and rail assemblies 108A and 108B, which are stacked as shown in FIGS. 2 and 3A-B. The block and rail assembly 108A include block 30A and rail 32A, while block and rail assembly 108B includes block 30B and rail 32B. Thus, the rails 32A and 32B are elongated sections, which are configured to be carried by and to move relative to respective blocks 30A and 30B. That is, the rails 32A and 32B are slideably received and carried by their respective blocks 30A and 30B. In one aspect, the ends 125A of the rail 32A of the block and rail assembly 108A is rigidly connected to a lower face 89 of the upper support 101 of the connection assembly 12; and the ends 125B of the rail 32B of the block and rail assembly 108B are rigidly connected to the outer surface 152 of the support plate 104 of the operation assembly 14. Furthermore, the blocks 30A and 30B are connected together via a plate 109 using any suitable fastener. As such, the rails 32A-B move along paths or axes that are substantially perpendicular to each other; and substantially parallel to each other. However, it should be appreciated that other manners for attaching the connection assembly 12 and the operation assembly 14 to respective block and rail assemblies 108A and 108B may be utilized. Thus, the rail 32A is substantially perpendicular to rail 32B, and as such, the block 30A guided by rail 32A allows movement along an axis that is perpendicular to the movement along an axis that is permitted by the block 30B that is guided by rail 32B. In addition, the ends each rail 32A-B is provided with two rigid stops 126 disposed at their ends 125A and 125B, which allow the blocks 30A-B to slide along the respective rails 32A-B a limited distance. Thus, the movement assembly 16 allows movement of the operation assembly 14 along two perpendicular or orthogonal paths. It should be appreciated that the components of the end-effector 10 may be formed of any suitable material, such as metal, including, aluminum and steel, polymeric material, or the like.

Thus, the movement assembly 16 provides relative mobility or movement in the X-Y plane (i.e. horizontal two-axis) between the operation assembly 14 portion of the end-effector 10, which includes the alignment arm 107 and the vacuum cups 106; and the connection assembly 12 portion of the end-effector 10, that is connected to the wrist assembly of the robotic arm 1. It should also be appreciated that because the alignment arm 107 and the level compensators 105 are affixed to the support plate 104, the alignment arm 107 and the level compensators 105 do not move relative to each other during normal operation of the end-effector 10. Continuing, the movement between the connection assembly 12 and the operation assembly 14 of the end-effector 10 enabled by the movement assembly 16 forms a passive compliance system that provides minimal friction between the connection and operation assemblies 12,14, while also being able to compensate for misalignments between the alignment holes 22 of the alignment arm 107 with electrically non-conductive alignment pins 203 that are mounted on each of the component bases 13 and on the fuel cell base plate 201 during pick up and release/place operations by the robotic arm 1. In addition, the passive compliance system enabled by the movement between the connection assembly 12 and the operation assembly 14 of the end-effector 10, along with the conical tips 207 of the alignment pins 203, may compensate for positional misalignments of various dimensions, including those as large as a few millimeters, which are much larger than the typical limitations of the accuracy and repeatability of a typical robotic arm.

Figure 4:
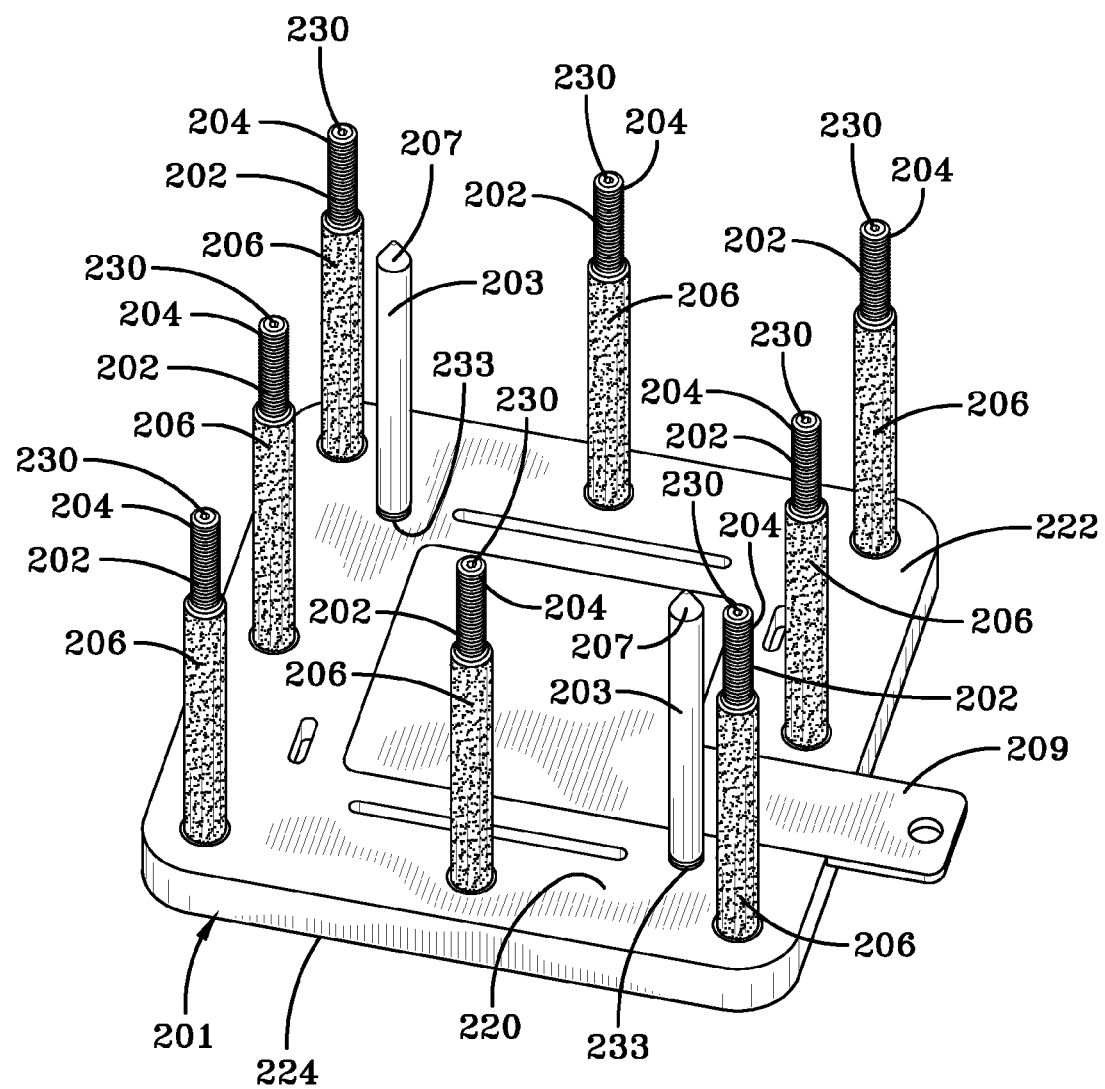
FIG. 4 is a perspective view of a fuel cell endplate assembly including non-conductive alignment pins attached thereto in accordance with the concepts of the present invention.
Figure 7A:
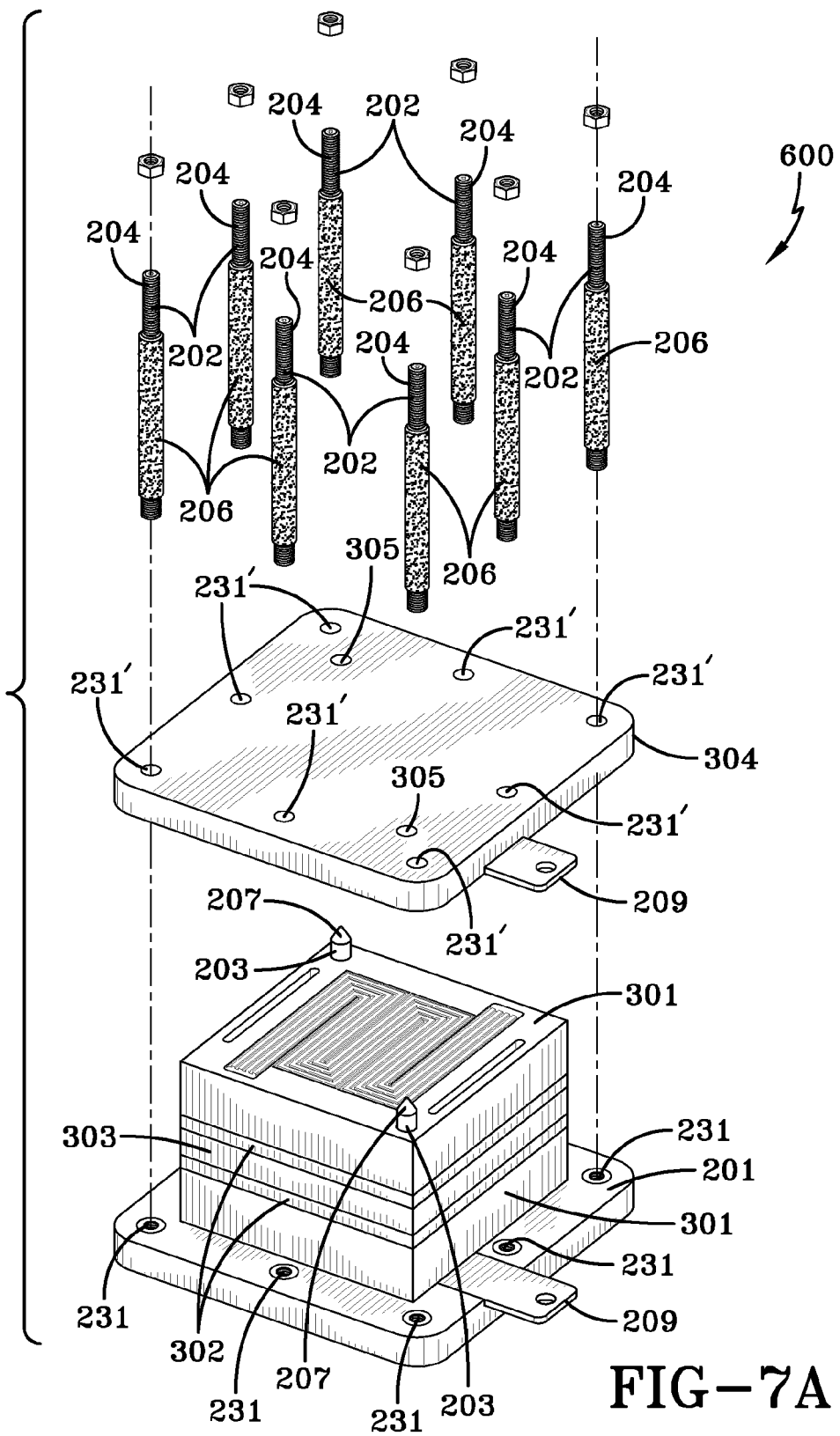
FIG. 7A is a perspective view showing a partially assembled fuel cell stack in accordance with the concepts of the present invention.
Figure 7B:
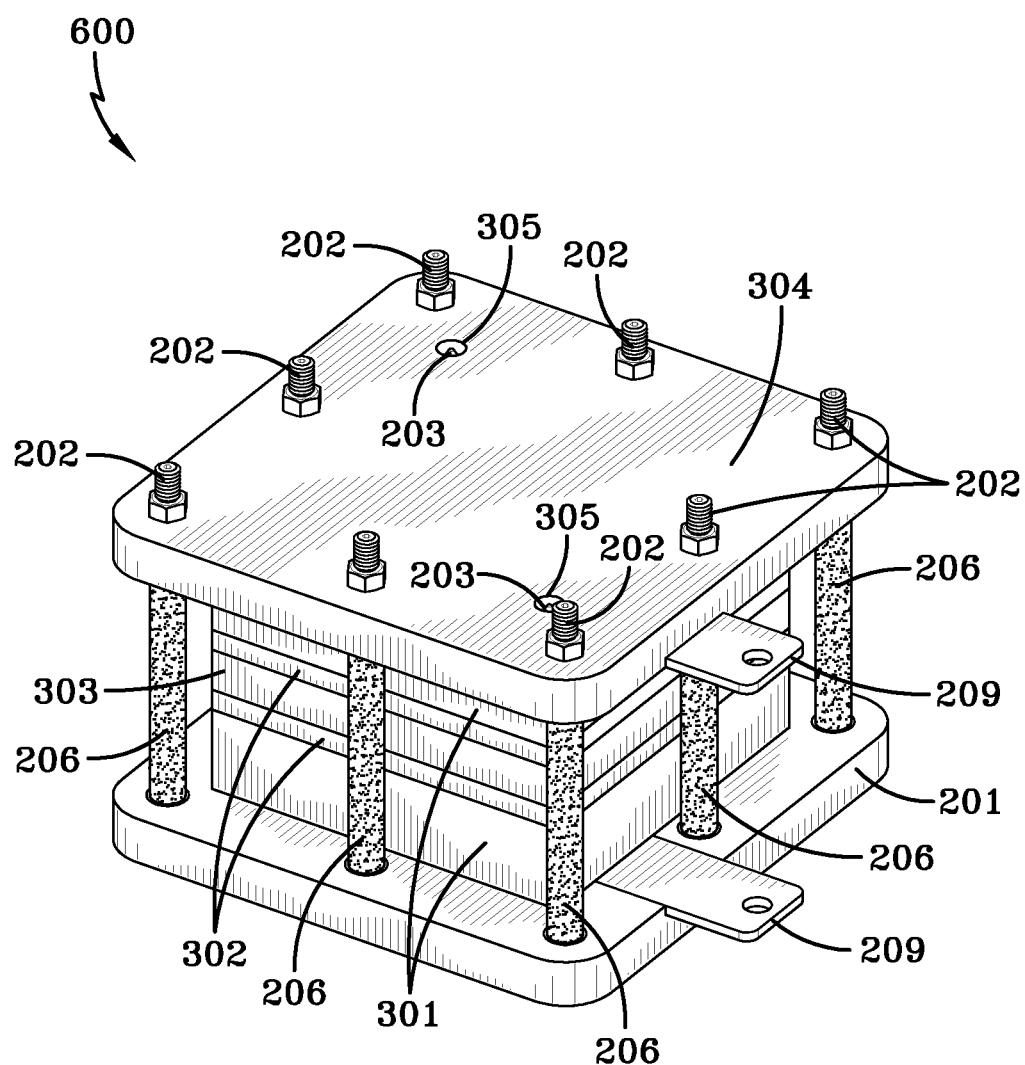
FIG. 7B is a perspective view of an assembled fuel cell stack in accordance with the concepts of the present invention.

In order to achieve the desired level of positional compensation between the alignment holes 22 of the alignment arm 107 of the end-effector 10 and the individual fuel cell components as they are stacked together to form a completed fuel cell 600, as shown in FIGS. 7A-B, the fuel cell base plate 201, as shown in FIGS. 4 and 5A-B, is utilized. Specifically, the fuel cell base plate 201 comprises a substantially planar base section 220 having opposed inner and outer surfaces 222,224, which may be formed of any suitable material, such as aluminum (poly)tetrafluoroethylene (PTFE), ultem, or the like for example. The base plate 201 also includes an electrically conductive current collector plate 209 that is flush-mounted to the inner surface 222 of the base section 220. A plurality of elongated, tie rods 202 having threads 204 disposed thereon at each end 230,232 extend from the inner surface 222 of the base section 220 at a substantially right angle. A portion of the length of the threaded tie rods 202 is covered by an electrical insulator 206 at a position that is proximate to the base section 220. It should be appreciated that the end 232 of the threaded tie rods 202 is attached to apertures 231 that are disposed in the base section 220, while end 230 is configured to threadably mate with a fastener in order to complete the assembly of the fuel cell 600, and to compress the components of the fuel cell stack 600 together. In addition, the electrically non-conductive alignment pins 203 are mounted in apertures 233 that are disposed on or through the base section 220 of the endplate 201 using any suitable means of fixation. Specifically, the alignment pins 203 extend from the outer surface 222 of the base section 220 of the end plate 201. The alignment pins 203 may be formed of (poly)tetrafluoroethylene (PTFE) or any other suitable electrically non-conductive material to reduce friction with the other fuel cell components during assembly, and to prevent short circuiting the fuel cell stack 600 during its operation. However, in other embodiments, the alignment pins 203 may comprise any suitable material, including conductive material. In particular, the alignment pins 203 may be dimensioned, such that they are longer than the final fuel cell stack length or height. For example, the alignment pins 203 may be approximately 0.5 inches in length, to permit the alignment of all fuel cell components, including fuel cell plate 304 that is structurally equivalent to the base plate 201. In addition, the alignment pins 203 are provided with a conical tip 207 that is distal to the base 220 in order to ease or facilitate the engagement and alignment between the positioning holes 22 of the alignment arm 107 of the end-effector 10 with the alignment pins 203 of the component base plate 13 during a pick or grasping operation; and to facilitate the engagement and alignment between the positioning holes 22 of the alignment arm 107 of the end-effector 10 with the alignment pins 203 of the fuel cell base plate 201 during release or placement operations performed by the end effector 10 when the fuel cell stack 600 is being assembled. It should also be appreciated that the tips 207 may also have any suitable tapered shape.

Continuing to FIGS. 6A-D, various components of the fuel cell configured for use with the present invention are shown, including: a fuel cell bipolar plate 301 (FIG. 6A), a gasket 302 (FIG. 6B), a membrane electrode assembly (MEA) 303 (FIG. 6C) and a cap plate 304 (FIG. 6D). Each of the fuel cell components 301, 302, 303, and 304 include guide holes 305 that are configured and positionally arranged to receive therethrough the alignment pins 203 that are permanently mounted on the first endplate 201, shown in FIGS. 4 and 5A-B and on the component bases 13, shown in FIG. 1. It should be appreciated that the guide holes 305 are configured and positionally arranged to be aligned with the alignment holes 22 of the alignment arm 107 during operation of the end-effector 10. It should also be appreciated that the cap plate 304 may include a base section 220' that is configured to be structurally equivalent to the base section 220 of the end plate 201, such that it is a mirror image thereof. The cap plate 304 may be formed of any suitable material, such as aluminum, (poly)tetrafluoroethylene (PTFE), ultem, and the like for example. In addition, the cap plate 304 includes mounting apertures 231' disposed therethrough and are positioned about its periphery to receive the threaded tie rods 202 therethrough. It should also be appreciated that guide holes or apertures 305 of the cap plate 304 are equivalent to apertures 233 of the end plate 201. Thus, in some embodiments the only structural difference between the fuel cell end or base plate 201 and the cap plate 304 is that the end plate 201 includes the tie rods 202 and alignment pins 203 attached thereto. An inner opening provided by the gasket 302 is slightly wider on each side than the gas diffusion layers (GDLs) 319 bonded on each side of the MEA plate 303. The allowance between the guide holes 305 of the fuel cell components 301,302,303,304 and the alignment pins 203 on the first endplate 201 is smaller than the allowance between the gas diffusion layers (GDLs) 319 and the inner opening of the fuel cell gaskets 302, shown in FIG. 6C. This enables the precision alignment of the fuel cell components in the fuel cell stack without overlapping the GDLs 319 over the fuel cell gaskets 302 and also to avoid overboard reactant leaks in the fuel cell. Thus, the fuel cell components 301,302,303,304 are configured to be stacked upon the fuel cell base plate 201, whereby alignment pins 203 of the base plate 201 are received within the guide holes 305 of each component. This serves to ensure that each of the fuel cell components 301,302,303,304 are precisely and accurately aligned with each other when the assembly of the fuel cell 600 is complete, as shown in FIGS. 7A-B.

FIG. 1 shows the robotic workcell 11 that is used for automated assembly of the fuel cell components according to the present invention. The workcell 11 comprises the robotic arm 1 and a workbench 409 upon which three fuel cell component stacks 5 are placed, which include a stack of bipolar plates 301, a stack of gaskets 302 and a stack of membrane electrode assemblies (MEA) 303 are disposed. In addition, the endplate 201 is also provided on the workbench 409. The three stacks of components 301, 302 and 303 are each stacked upon the component base 13. Specifically, the component base 13 includes a substantially flat or planar base section 450 having an inner surface and opposed outer surface 452,454. The component base 13 includes alignment pins 203, which extend from the outer surface 452 of the base section 450, and are configured to be received through the guide holes 305 of the components 301,302,303,304. The bipolar plates 301 on one base 13 and the MEAs 303 on the second base 13 are aligned all in the same direction via pins 203, for example, with the anode flow field and the cathode catalyst layer oriented upwards. Thus, during operation of the robotic workcell 11, robotic arm 1 and the attached end-effector 10 pick up the fuel cell components via the vacuum cups 106 and place them on the fuel cell endplate 201 in the following order: bipolar plate 301, gasket 302, MEA 303, gasket 302, bipolar plate 301, and cap plate 304. However, it should be appreciated that the components may be arranged in any desired configuration, using more or fewer components. As such, the alignment pins 203 of the base plate 201 are received through guide holes 305 of the components 301, 302, 303 and 304. That is, during pick up operations, the positioning holes 22 of the guide arm 107 of the end-effector 10 engage with and receive the alignment pins 203 of the component base 13 even if the misalignment is as large as a few millimeters, while the passive compliance system provided by the end-effector 10 allows the positioning holes 305 of the fuel cell components 301,302,303,304 to realign with the alignment pins 203 when the end-effector 10 approaches the fuel cell stack 600 being assembled on the base plate 201. In this way, the vacuum cups 106 of the end-effector 10 always step on the peripheral area of the fuel cell components 301,302,303,304 in the same position within a certain tolerance. When the fuel cell components 301,302,303,304 are released on the fuel cell stack, the guide holes 305 on the fuel cell components 301,302,303, 304 and the positioning holes 22 on the end-effector 10 align with the alignment pins 203 of the endplate 201 and the fuel cell components 301,302,303,304 are always released in the same position within a certain tolerance.

Thus, during assembly of the fuel cell 600, the allowance between the alignment pins 203 and the alignment holes 22 of the alignment arm 107 of the end-effector 10 permits the fuel cell components 301,302,303,304 to slide easily along the alignment pins 203 of the end plate 201 and to align with each other within a tolerance that is smaller or equal to the allowance between the gas diffusion layer of the membrane electrode assembly 303 and the inner opening of the fuel cell gaskets 302, when the fuel cell 600 is formed. This prevents the gaskets of the fuel cell 600 from accidentally overlapping the gas diffusion layers (GDLs) 319 during the fuel cell assembly process, which is a major cause of overboard gas leaks during fuel cell operation.

Therefore, one advantage of the present invention is that an end-effector for a robotic system enables the automated assembly of fuel cell stack components. Another advantage of the present invention is that the end-effector for a robotic system allows for the precise alignment of the components of a fuel cell stack during its automated assembly. Still another advantage of the present invention is that the end-effector for a robotic system allows for the accurate engagement of the components of a fuel cell stack during its automated assembly.

Thus, it can be seen that the objects of the present invention have been satisfied by the structure and its method for use presented above. While in accordance with the Patent Statutes, only the best mode and preferred embodiment have been presented and described in detail, with it being understood that the present invention is not limited thereto or thereby. Accordingly, for an appreciation of the true scope and breadth of the invention, reference should be made to the following claims.

What is claimed is:

1. An end-effector for attachment to a moveable wrist assembly of a robotic arm for assembly of a fuel cell stack comprises:
   a connection assembly adapted to be attached to the wrist assembly of the robotic arm;
   a movement assembly attached to said connection assembly; and
   an operation assembly attached to said moving assembly, wherein said moving assembly is configured to enable said operation assembly to move relative to said connection assembly, said operation assembly including an alignment arm having at least two alignment apertures disposed therethrough and at least one vacuum cup;
   wherein said alignment arm has at least two alignment apertures that are configured to receive alignment pins provided by a plurality of component bases each carrying one or more fuel cell components aligned by the alignment pins, so as to position said one or more vacuum cups with the fuel cell component being grasped, and said at least two alignment apertures of said alignment arm configured to receive alignment pins provided by a fuel cell base plate of the fuel cell stack, so as to align the grasped fuel cell component with the alignment pins of the fuel cell base plate when the grasped fuel cell component is placed thereon.

2. The end-effector of claim 1, wherein said operation assembly moves relative to said connection assembly along at least two axes that are substantially orthogonal to each other.

3. The end-effector of claim 2, wherein said alignment arm extends at an oblique angle relative to each said axis.

4. The end-effector of claim 2, wherein said alignment arm extends in a direction that is about 45 degrees from said at least two axes.

5. The end-effector of claim 1, wherein said operation assembly comprises a support plate to which said one or more vacuum cups are attached, and to which said alignment arm is attached.

6. The end-effector of claim 5, wherein said alignment apertures are positioned at a point beyond a peripheral edge of said support plate.

7. The end-effector of claim 1, wherein said alignment arm radially extends from the longitudinal axis of the end-effector.

8. The end-effector of claim 1, wherein said alignment arm is positioned above said one or more vacuum cups.

9. The end-effector of claim 1, wherein said operation assembly and said connection assembly are axially aligned.

10. The end-effector of claim 1, wherein a position of said one or more vacuum cups is adjustable relative to said alignment arm.

11. A method for assembling a fuel cell stack using a robotic arm comprising:
providing a plurality of component bases having at least two alignment pins extending therefrom, each said component base carrying one or more fuel cell components, such that each fuel cell component is aligned by said at least two alignment pins;
providing a fuel cell base plate having at least two alignment pins extending therefrom;
providing an end-effector having a connection assembly attached to the robotic arm, said end-effector including an alignment arm having at least two alignment apertures disposed therethrough, and at least one vacuum cup to grasp and release the one or more fuel cell components, wherein said alignment arm and said at least one vacuum cup are moveably attached to said connection assembly;
moving said end-effector, such that said alignment apertures of said alignment arm receive said alignment pins of one of said plurality of component bases;
controlling the end-effector to grasp the fuel cell component from said component base;
moving said end-effector with said grasped fuel cell component, such that said alignment apertures of said alignment arm receive said alignment pins of said fuel cell base plate; and
controlling said end-effector to release the component onto said full cell base plate so that the fuel cell component is in alignment with said alignment pins of said fuel cell base plate.

12. The method of claim 11, wherein said alignment pins of said plurality of component bases, and said alignment pins of said fuel cell base plate have a conical tip.

13. The method of claim 11, wherein said alignment pins of said plurality of component bases, and said alignment pins of said fuel cell base plate are electrically non-conductive.

14. The method of claim 11, wherein during each said moving step, said alignment arm moves along at least two axes that are substantially orthogonal to each other.

15. The method of claim 11, wherein said fuel cell components include at least two guide apertures disposed therethrough that are configured to receive said alignment pins of said component bases and of said fuel cell base plate.

16. A robotic workcell for assembling a fuel cell comprising:
an end-effector comprising:
a connection assembly adapted to be attached to a moveable wrist assembly of a robotic arm of the workcell;
a movement assembly attached to said connection assembly; and
an operation assembly attached to said moving assembly, wherein said movement assembly is configured to enable said operation assembly to move relative to said connection assembly, said operation assembly including an alignment arm having at least two alignment apertures disposed therethrough and at least one vacuum cup;
a plurality of component bases having at least two alignment pins extending therefrom, each said component base carrying at least one fuel cell component in alignment with said at least two alignment pins; and
a fuel cell base plate having at least two alignment pins extending therefrom;
wherein during a first step operation, said alignment apertures of said alignment arm are received by said at least two alignment pins of one of said plurality of component bases, whereupon said vacuum cups grasp the fuel cell component, and during a second step, said alignment apertures of said alignment arm are received by said at least two alignment pins of said fuel cell base plate, whereupon said vacuum cups release the fuel cell component onto the fuel cell end plate in alignment with said alignment pins of said fuel cell end plate.

17. The robotic workcell of claim 16, wherein the fuel cell components include at least two guide apertures to receive said at least two alignment pins of said component bases and said at least two alignment pins of said fuel cell end plate.

18. The robotic workcell of claim 16, wherein each said component base carries one fuel cell component selected from the group consisting of a bipolar plate, a gasket, a membrane electrode assembly plate, and a cap plate.

19. The robotic workcell of claim 16, wherein said at least two alignment pins of said plurality of component bases have a conical tip.

20. The robotic workcell of claim 16, wherein said at least two alignment pins of said fuel cell base plate have a conical tip.

21. The robotic workcell of claim 16, wherein said at least two alignment pins of said plurality of component bases are electrically non-conductive.

22. The robotic workcell of claim 16, wherein said at least two alignment pins of said fuel cell base plate are electrically non-conductive.

23. The robotic workcell of claim 16, wherein said operation assembly moves relative to said connection assembly along at least two axes that are substantially orthogonal to each other.

* * * * *